(No Model.)

T. & T. J. DOWNS.
HARVESTING KNIFE.

No. 426,783. Patented Apr. 29, 1890.

WITNESSES
K. M. Plaisted
Warren Hull

INVENTOR
Theodore Downs
Thomas J. Downs.
By H. H. Tolman,
His Attorney.

UNITED STATES PATENT OFFICE.

THEODORE DOWNS AND THOMAS J. DOWNS, OF SPRINGFIELD, OHIO.

HARVESTING-KNIFE.

SPECIFICATION forming part of Letters Patent No. 426,783, dated April 29, 1890.

Application filed July 29, 1889. Serial No. 319,096. (No model.)

*To all whom it may concern:*

Be it known that we, THEODORE DOWNS and THOMAS J. DOWNS, citizens of the United States, residing at Springfield, in the county of Clark and State of Ohio, have invented certain new and useful Improvements in Harvesting-Knives, of which the following is a specification, reference being had therein to the accompanying drawings.

This invention relates to certain new and useful improvements in harvesting-knives; and the object of our invention is to provide a blade capable of two distinct uses—the one that of enabling the harvest-hand to lift within easy reach, without stooping or bending over to any extent, such stalks of corn, sugar-cane, weeds, &c., as by storms or from other causes have been flattened down to near the ground, and the other to cut such stalks, &c., near the ground while holding onto their elevated ends. With these ends in view, the blade possesses certain peculiarities, more fully hereinafter described, and pointed out in the claims.

Figure 1:
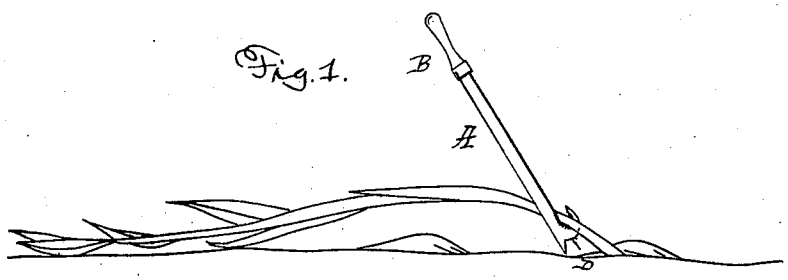
Figure 2:
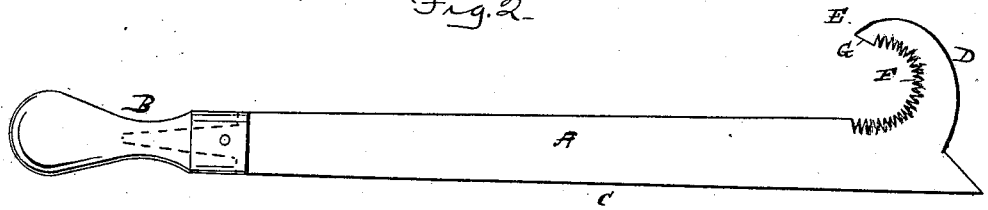

In the accompanying drawings, forming a part of this specification, and in which like reference-letters indicate corresponding parts, Figure 1 represents a perspective view of our improved harvesting-knife and a stock of blown-down corn, suggesting the use of the knife; and Fig. 2, a side view of the knife alone.

The letter A designates a blade of the usual length of harvesting-knives—from eighteen to twenty-four inches, including the handle B. The blade is fashioned with a keen cutting-edge C and a hook D, preferably wider at its juncture with the blade, so as to increase its strength, and brought to a comparatively sharp tapering point E, to facilitate projecting it under the stalks, &c. In the concave side of the hook, which is toward the handle, it is provided, commencing a short distance from the extreme point of the hook, with a number of teeth F, which occupy a portion of the back of the blade, so that the teeth form a substantially semicircular pocket adapted to embrace the stalks, &c. The teeth are by preference rounded off at the sides and reduced to substantially needle-point, sharp enough to enter the body of the stalk, &c. They are not designed, however, to have any cutting action, but merely prick the stalks, so as to prevent the hook from sliding on them, whereby the stalks, &c., will be quickly lifted by placing the hook under them in proximity to their lower end and drawing the blade upward. The concave side of the hook not occupied by the teeth is preferably sharpened at the forward edge, as suggested at G, which may be used in clearing away smaller obstructions about the stalk, &c. In some localities a great deal of the corn, sugar-cane, &c., is blown down to near the ground, and the work of stooping to gather it up into the arms before cutting it near the roots, which is the usual way, becomes very tiresome and consumes considerable time in the course of a day. By this improvement the labor of stooping over is entirely avoided, since the hand, in coming up to a blown-down stalk, needs only to reach under it with the hook of this blade and lift its head within easy reach of his left hand. He then takes hold of the stalk, and, turning the blade over as he disengages the hook, makes a stroke at the stalk and cuts it off. It is usual to carry the stalks thus cut into the arms and until enough is gathered to form a bundle, which is then tied. The left arm is therefore more or less filled when the harvest-hand is manipulating this implement to raise the blown-down stalks. It will therefore be seen that the great inconvenience of stooping over with this load is avoided by the use of our improved knife. The amount of harvesting that a man can do with this blade thus constructed is greatly in excess of that he can do with the blade of the ordinary construction devoid of our lifting attachment.

We are aware that it is not broadly new to provide harvesting-knives with a hook at the back thereof; but such a hook, when provided with teeth, as herein described, performs its work more advantageously and differently than when devoid of such teeth. The teeth enter the stalk and prevent the hook from sliding, so that the hold the hook takes upon the stalk enables the user to quickly elevate the stalk. It is then to be cut by a blow to be given with the cutting-edge of the knife. The labor of cutting the stalks by drawing upon the knife while the hook is in engagement with them is too excessive to admit of being practiced. It is the sudden blow which does the work of cutting, while through our improved hook the stalk can be rapidly elevated, the teeth entering the stalk in the act of elevating it.

Having thus fully described our invention, what we claim as new, and desire to secure by Letters Patent, is—

As an improved article of manufacture, a harvesting-knife having a cutting-edge and a curved hook projecting from the back at or near the end thereof, with its end tapered to a point, and having at its inner or concave side a short cutting-edge and a series of teeth with rounded points, substantially as shown and described.

In testimony whereof we affix our signatures in presence of two witnesses.

THEODORE DOWNS.
THOMAS J. DOWNS.

Witnesses:
E. S. WALLACE,
JAS. E. ORCUT.